(12) United States Patent
Yoo et al.

(10) Patent No.: US 12,401,833 B2
(45) Date of Patent: Aug. 26, 2025

(54) METHOD AND APPARATUS FOR PROVIDING MULTI VIEW SERVICE

(71) Applicant: TVING CO., LTD., Seoul (KR)

(72) Inventors: Gui Yong Yoo, Seoul (KR); Young Hun Heo, Seoul (KR); Jae Min Kim, Seoul (KR); Su Min Chae, Seoul (KR); Seong Cheol Jo, Seoul (KR)

(73) Assignee: TVING CO., LTD., Seoul (KR)

( * ) Notice: Subject to any disclaimer, the term of this patent is extended or adjusted under 35 U.S.C. 154(b) by 0 days.

(21) Appl. No.: 18/721,902

(22) PCT Filed: Dec. 20, 2022

(86) PCT No.: PCT/KR2022/020881
§ 371 (c)(1),
(2) Date: Jun. 20, 2024

(87) PCT Pub. No.: WO2023/121250
PCT Pub. Date: Jun. 29, 2023

(65) Prior Publication Data
US 2025/0071349 A1 Feb. 27, 2025

(30) Foreign Application Priority Data
Dec. 22, 2021 (KR) .......................... 10-2021-0184634

(51) Int. Cl.
*H04N 21/218* (2011.01)
*G06F 3/0486* (2013.01)
(Continued)

(52) U.S. Cl.
CPC ..... *H04N 21/21805* (2013.01); *G06F 3/0486* (2013.01); *H04N 21/4316* (2013.01); *H04N 21/4758* (2013.01); *H04N 21/4858* (2013.01)

(58) Field of Classification Search
CPC ......... H04N 21/21805; H04N 21/4316; H04N 21/4758; H04N 21/4858; H04N 21/2187;
(Continued)

(56) References Cited

U.S. PATENT DOCUMENTS 9,881,085 B2 * 1/2018 Tan ..................... G06F 16/9538
10,516,911 B1 * 12/2019 Nielsen ............. H04N 21/4223
(Continued)

FOREIGN PATENT DOCUMENTS

KR 10-2018-0043712 A 4/2018
KR 10-2019-0059290 A 5/2019
(Continued)

OTHER PUBLICATIONS

KR OA dated Feb. 19, 2024.
KR NOA dated Sep. 12, 2023.
Internaltiona Search Report dated Mar. 22, 2023.

*Primary Examiner* — Alazar Tilahun
(74) *Attorney, Agent, or Firm* — Harvest IP Law, LLP

(57) ABSTRACT

A multi-view service providing method according to an embodiment of the present invention is performed through an apparatus including a processor and a memory, and the method comprises the steps of: (a) receiving one or more videos from one or more cameras individually capturing each artist belonging to an artist group; (b) determining a multi-view layout setting on a user's terminal for the received one or more videos; and (c) outputting the received one or more videos on the user's terminal according to the determined multi-view layout setting by the one or more processors in combination with a computing device, and the multi-view layout setting includes a first multi-view layout setting including one main video and one or more sub-videos on one screen, and a second multi-view layout setting including one or more main videos on one screen.

16 Claims, 14 Drawing Sheets

(51) Int. Cl.
*H04N 21/431* (2011.01)
*H04N 21/475* (2011.01)
*H04N 21/485* (2011.01)

(58) Field of Classification Search
CPC .......... H04N 21/2665; H04N 21/2743; H04N 21/4312; H04N 23/661; G06F 3/0486
See application file for complete search history.

(56) References Cited

U.S. PATENT DOCUMENTS

| | | | |
|---|---|---|---|
| 10,600,446 B2* | 3/2020 | Sakamoto | G09B 9/00 |
| 10,901,570 B2* | 1/2021 | Bender | G06F 3/04812 |
| 2010/0208082 A1* | 8/2010 | Buchner | H04N 21/4788 |
| | | | 348/739 |
| 2011/0080425 A1* | 4/2011 | Kim | H04N 21/6587 |
| | | | 345/629 |
| 2013/0259447 A1* | 10/2013 | Sathish | G11B 27/105 |
| | | | 386/278 |
| 2014/0186004 A1* | 7/2014 | Hamer | G11B 27/32 |
| | | | 386/223 |
| 2015/0189368 A1* | 7/2015 | Lee | H04N 21/8456 |
| | | | 725/37 |
| 2018/0227501 A1* | 8/2018 | King | H04S 7/302 |
| 2022/0182251 A1* | 6/2022 | Jacobs | H04N 21/4821 |
| 2023/0260550 A1* | 8/2023 | Shires | H04N 21/23424 |
| | | | 386/241 |

FOREIGN PATENT DOCUMENTS

| | | |
|---|---|---|
| KR | 10-2019-0083906 A | 7/2019 |
| KR | 10-2011327 B1 | 8/2019 |
| KR | 10-2054116 B | 12/2019 |
| KR | 10-2020-0116378 A | 10/2020 |
| KR | 10-2020-0139557 A | 12/2020 |
| KR | 10-2239848 B1 | 4/2021 |
| KR | 10-2021-0087918 A | 7/2021 |

* cited by examiner

【Figure 1】
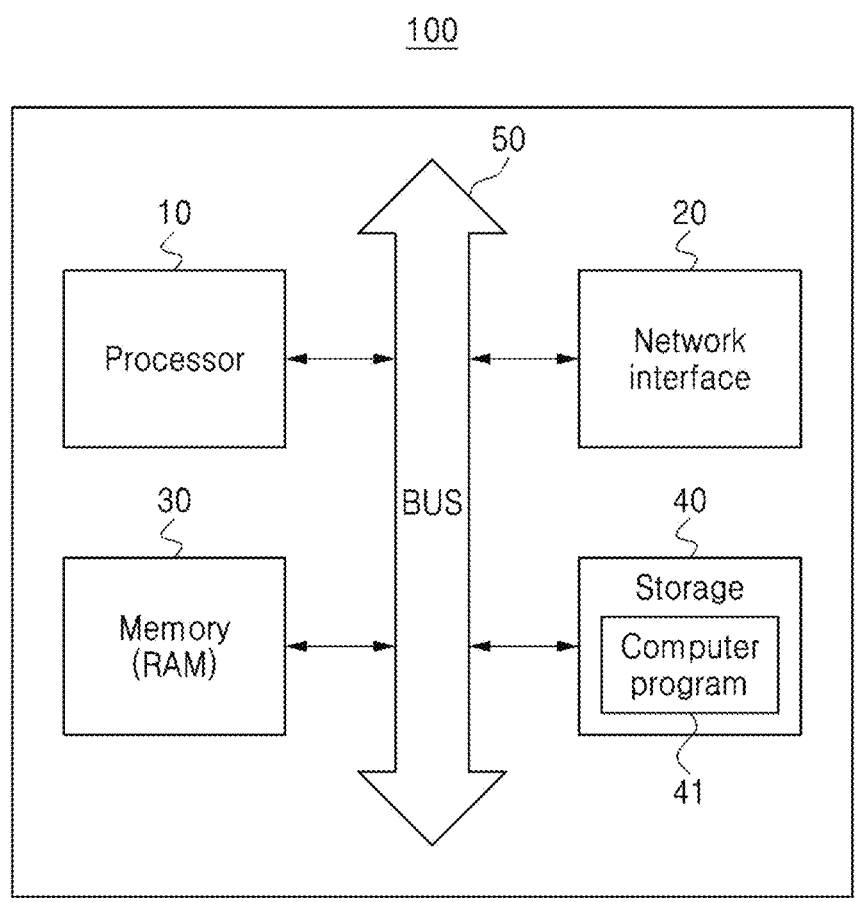

[Figure 2]
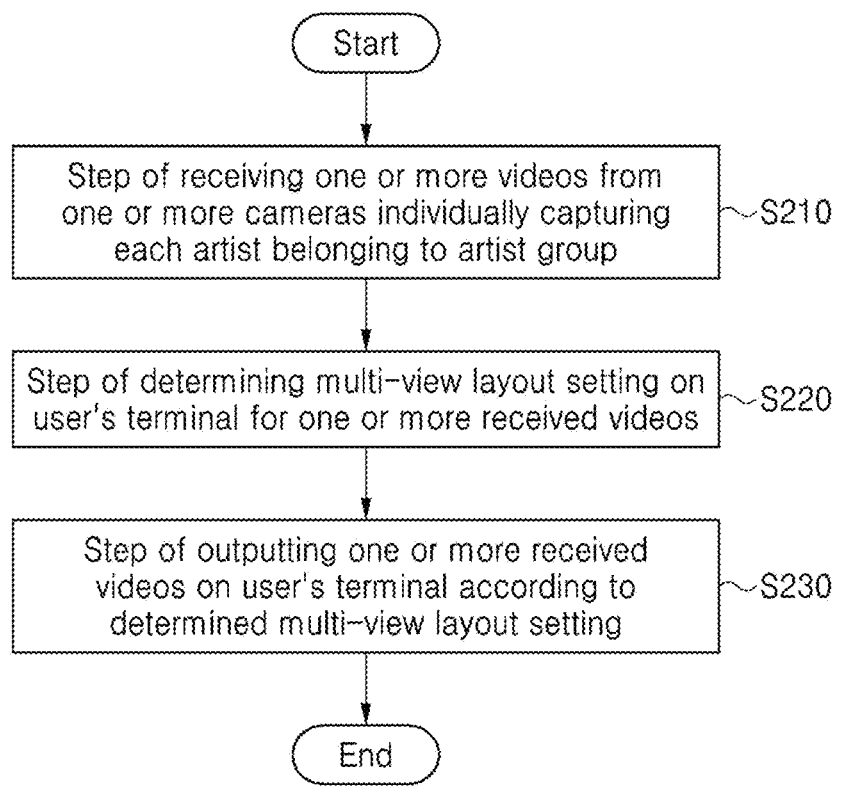

[Figure 3]
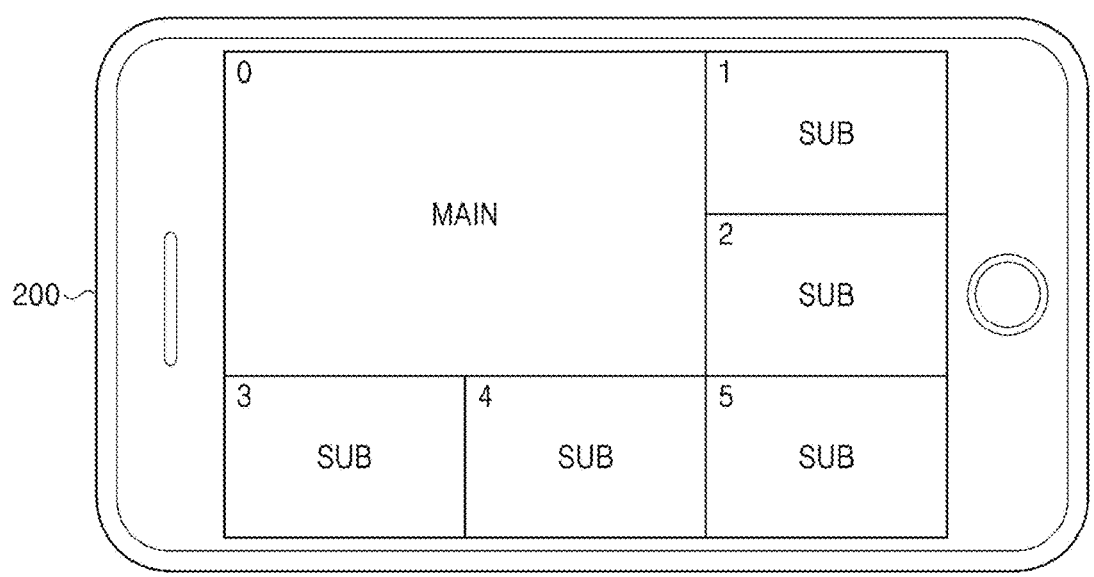

【Figure 4】
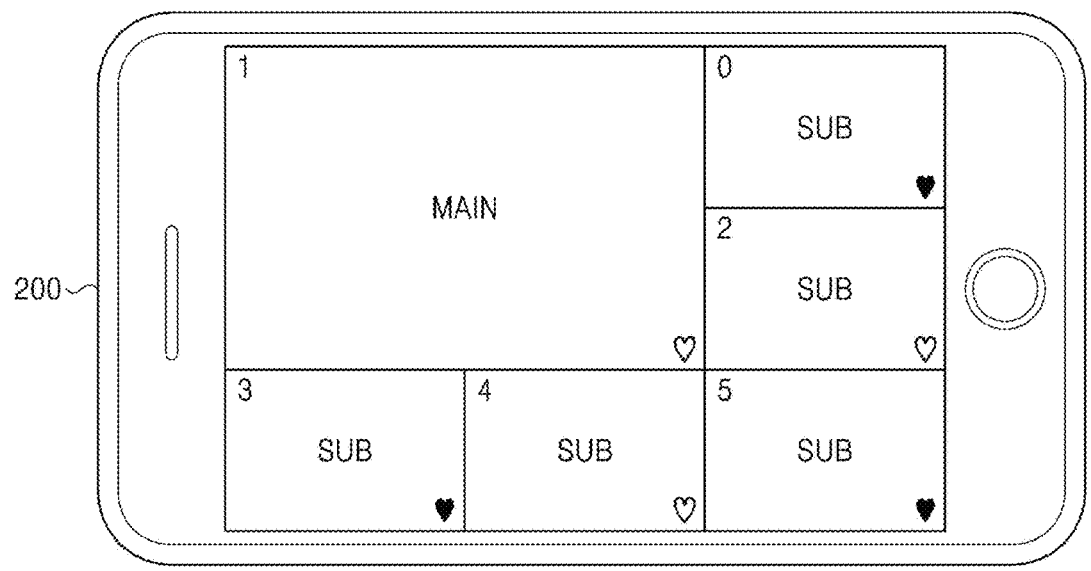
【Figure 5】
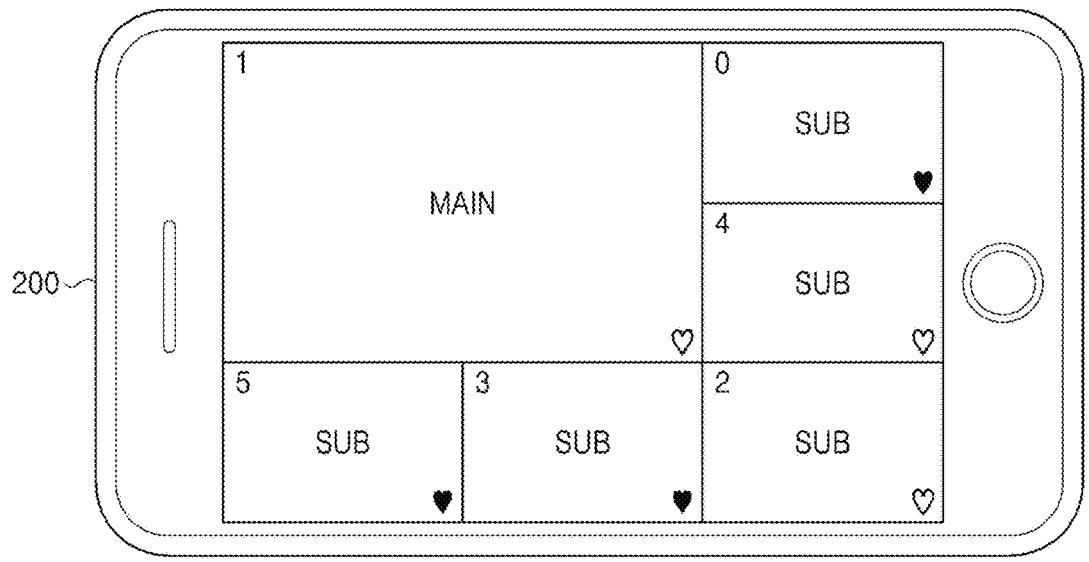

【Figure 6】
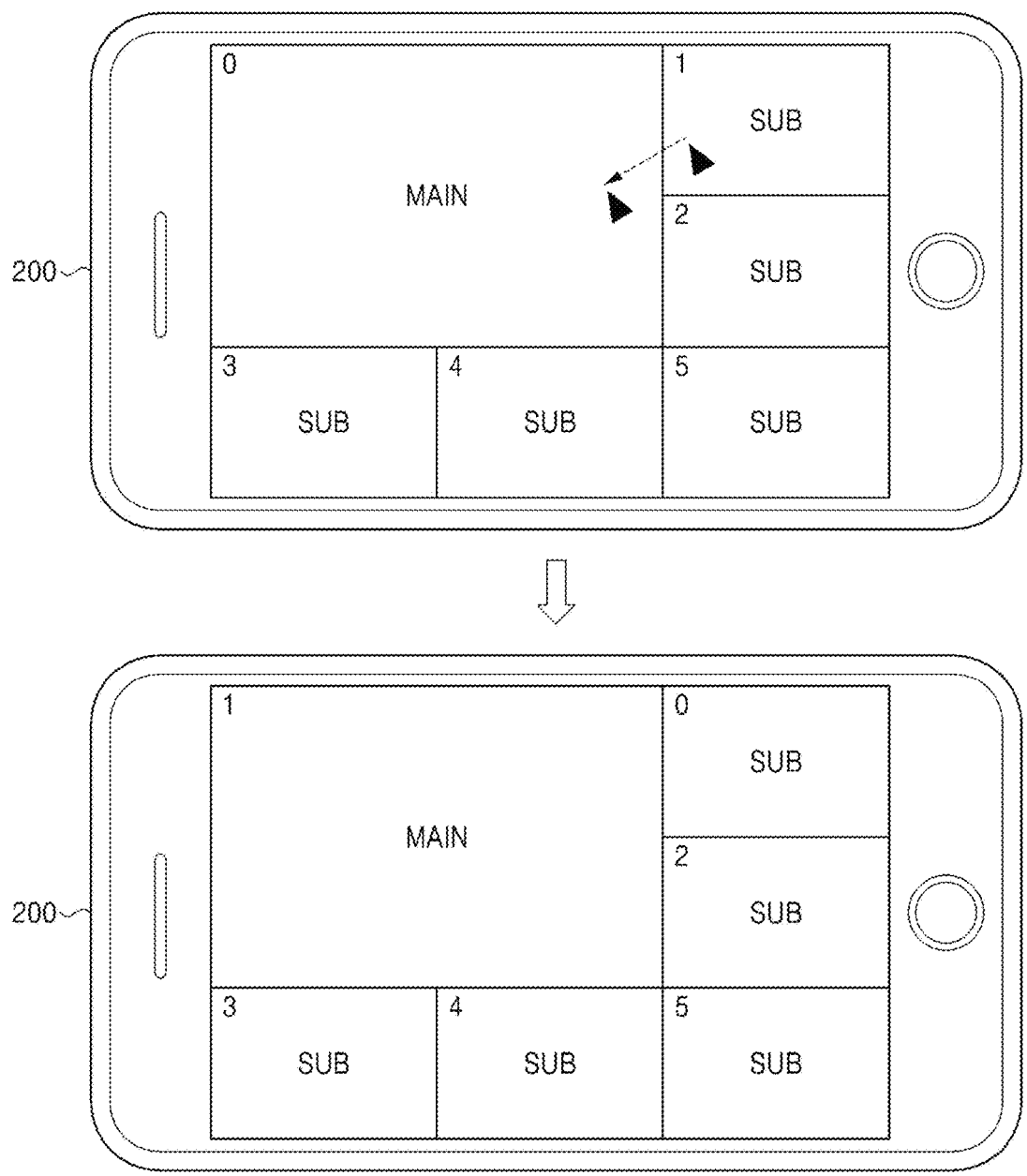

[Figure 7]
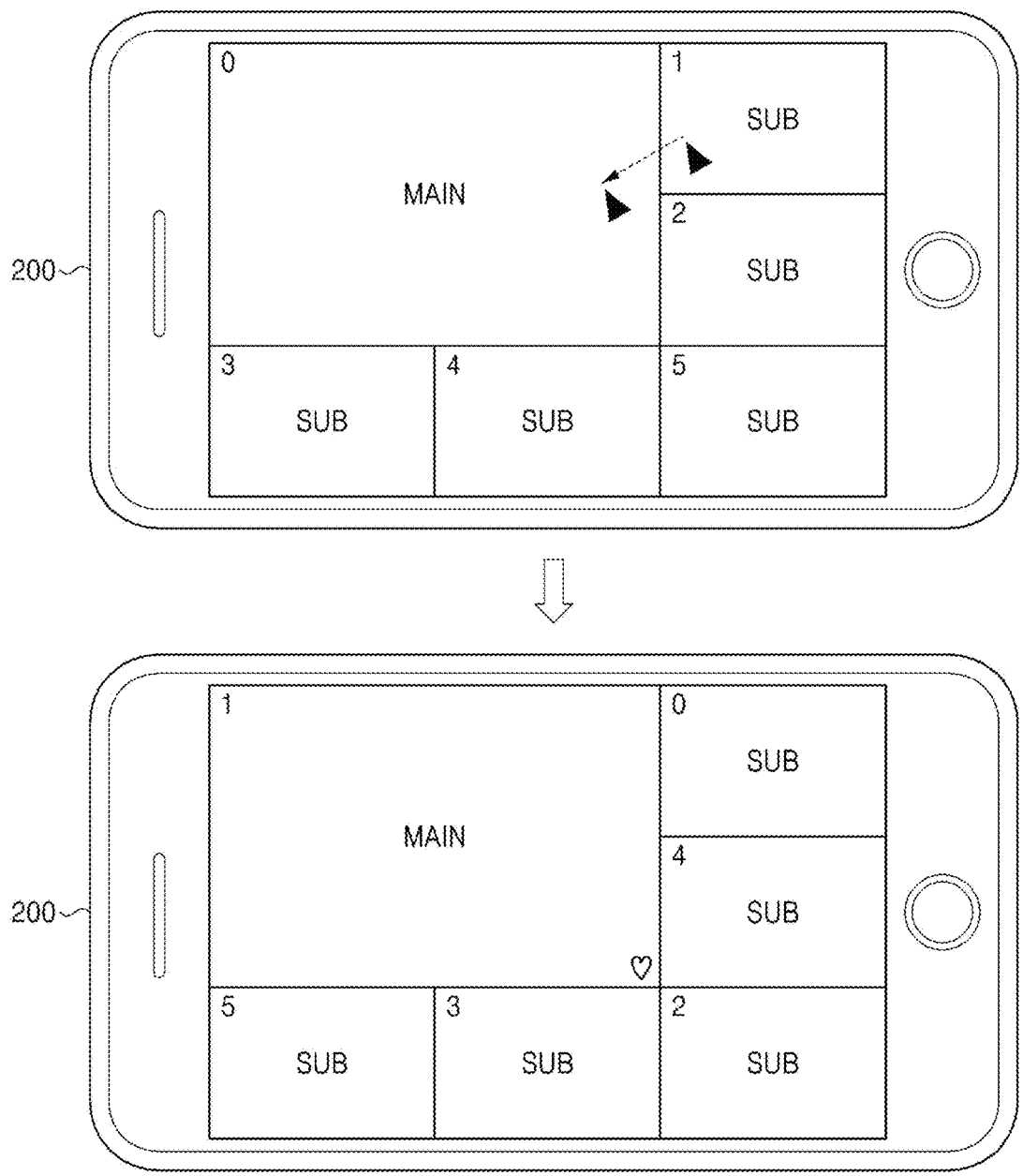

[Figure 8]
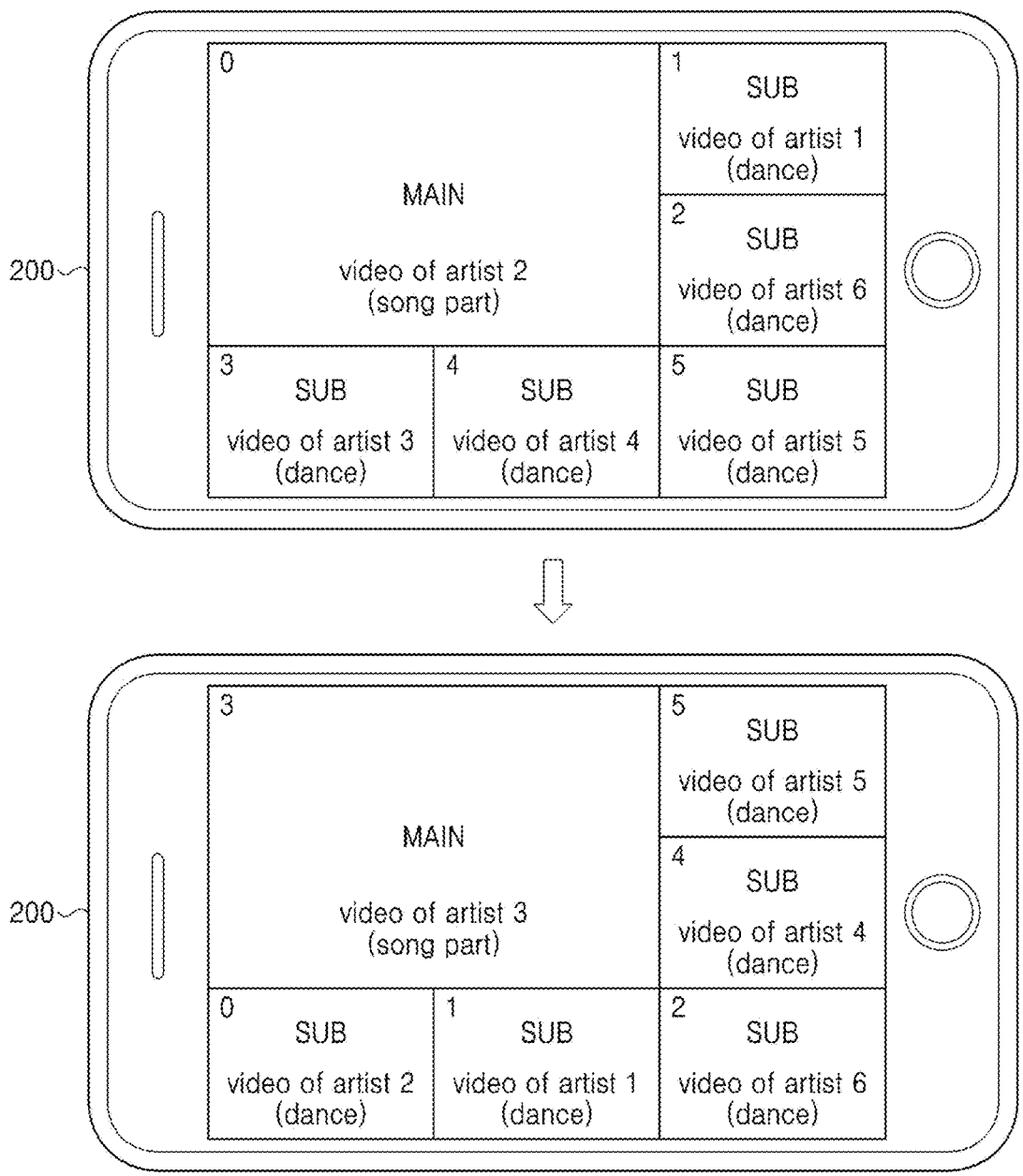

[Figure 9]
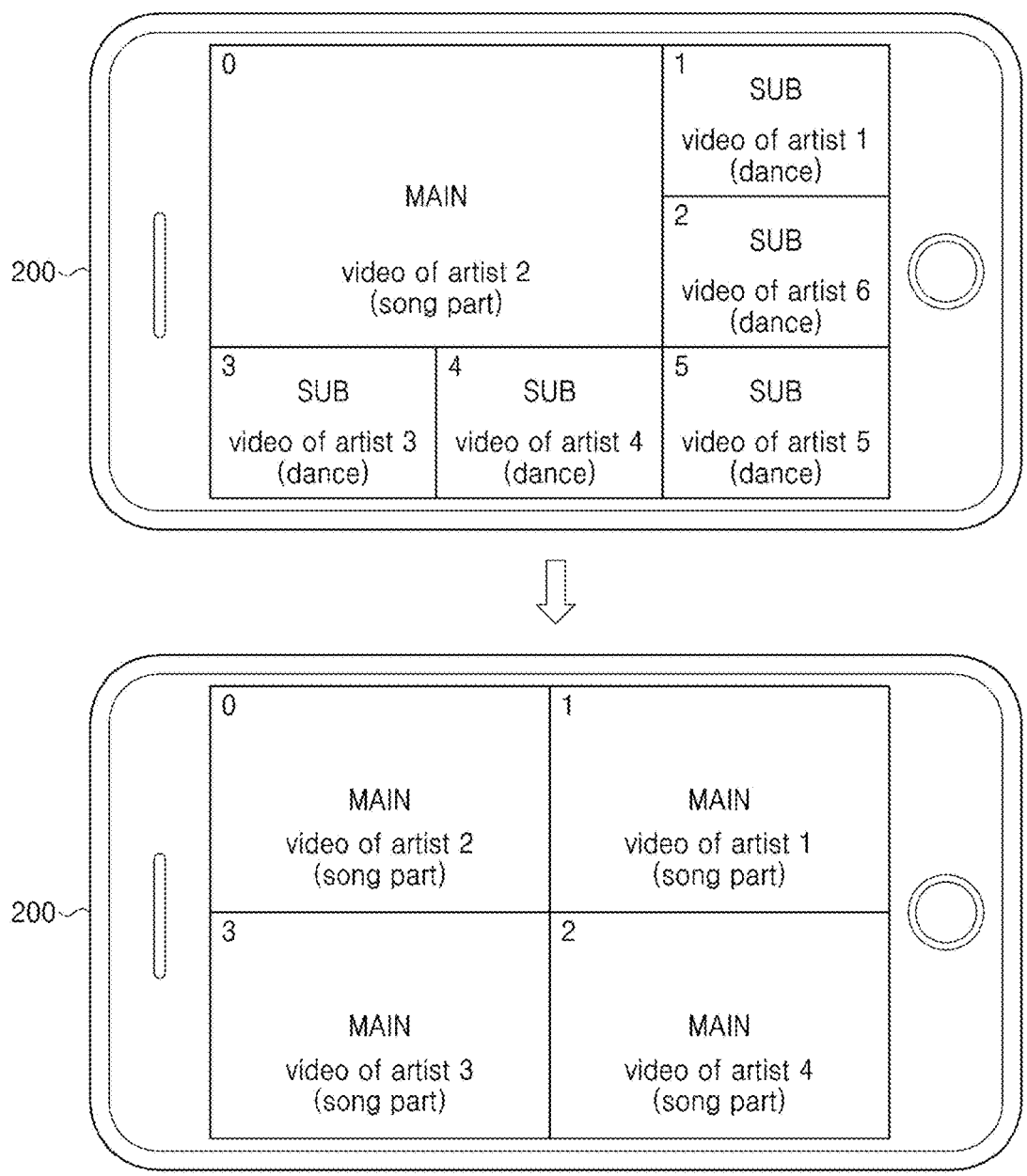

[Figure 10]
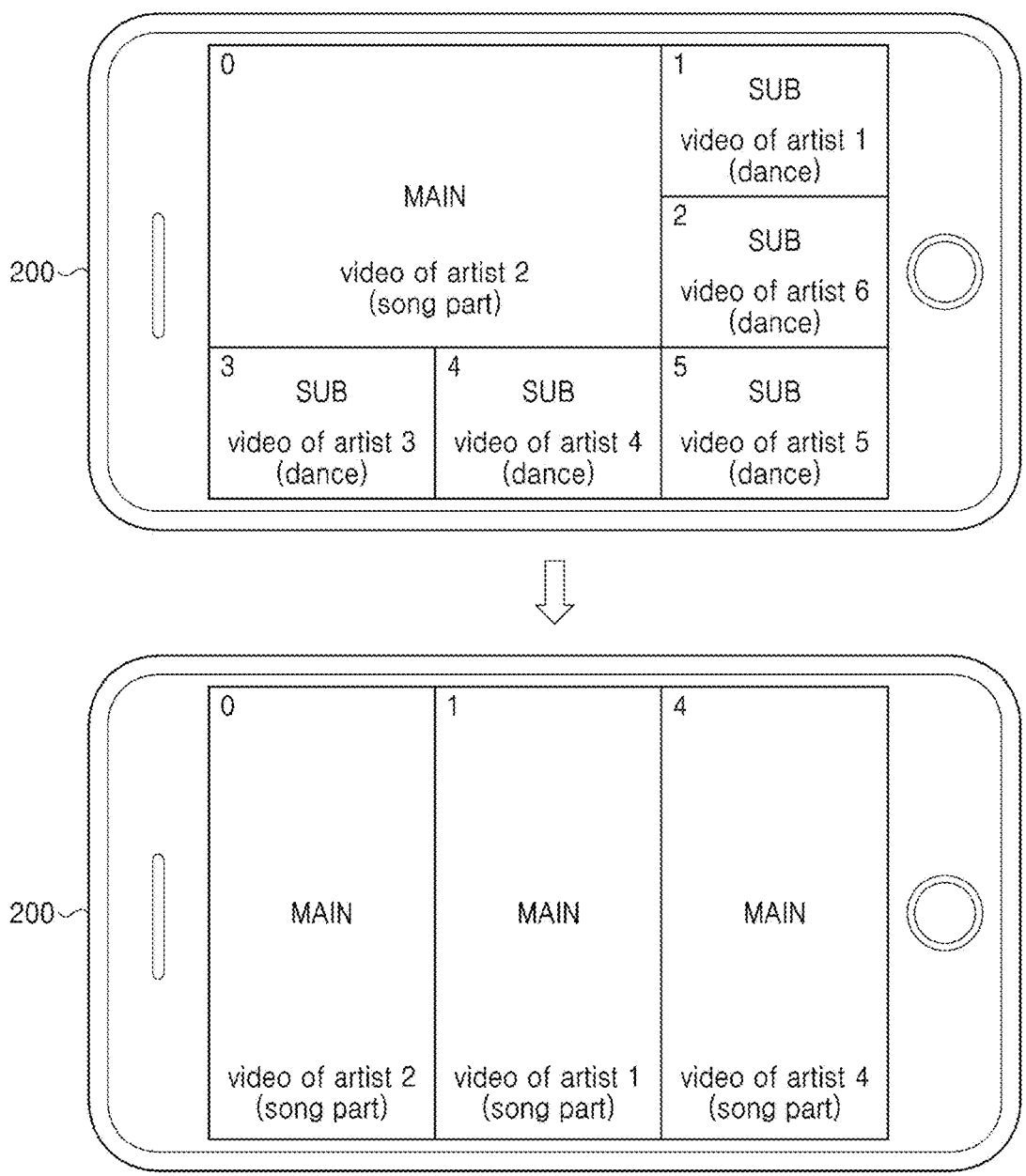

[Figure 11]
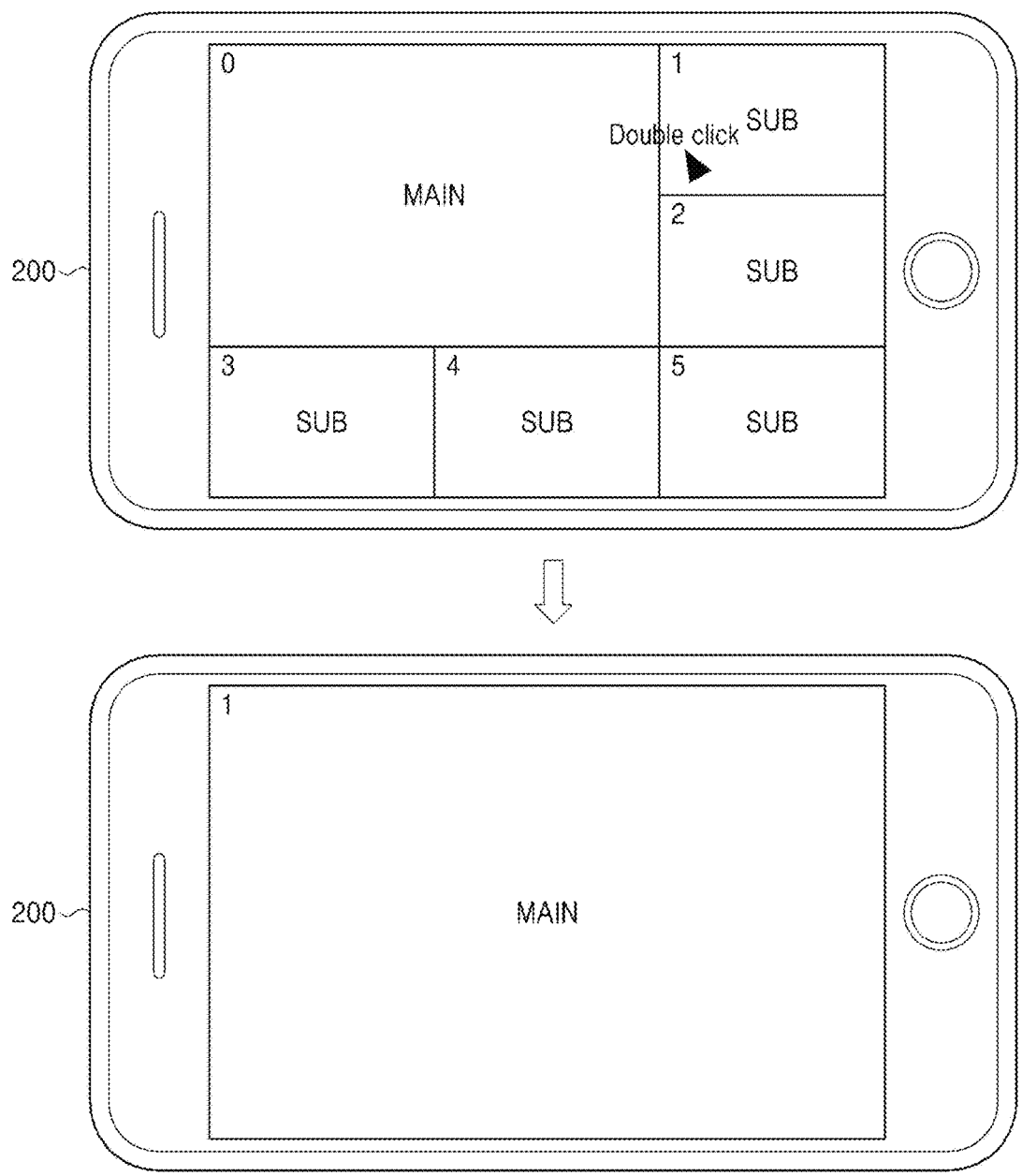

【Figure 12】
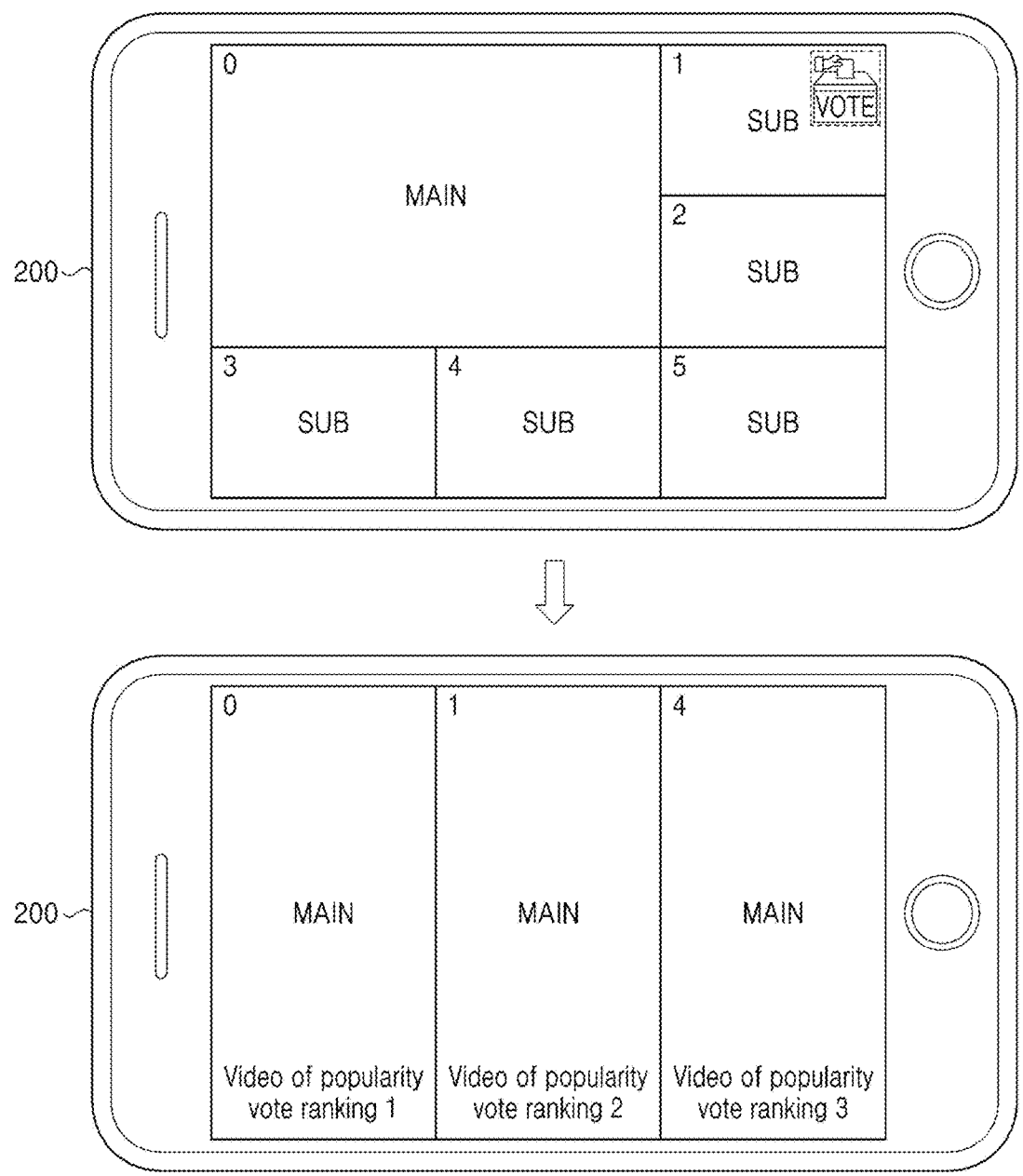

[Figure 13]
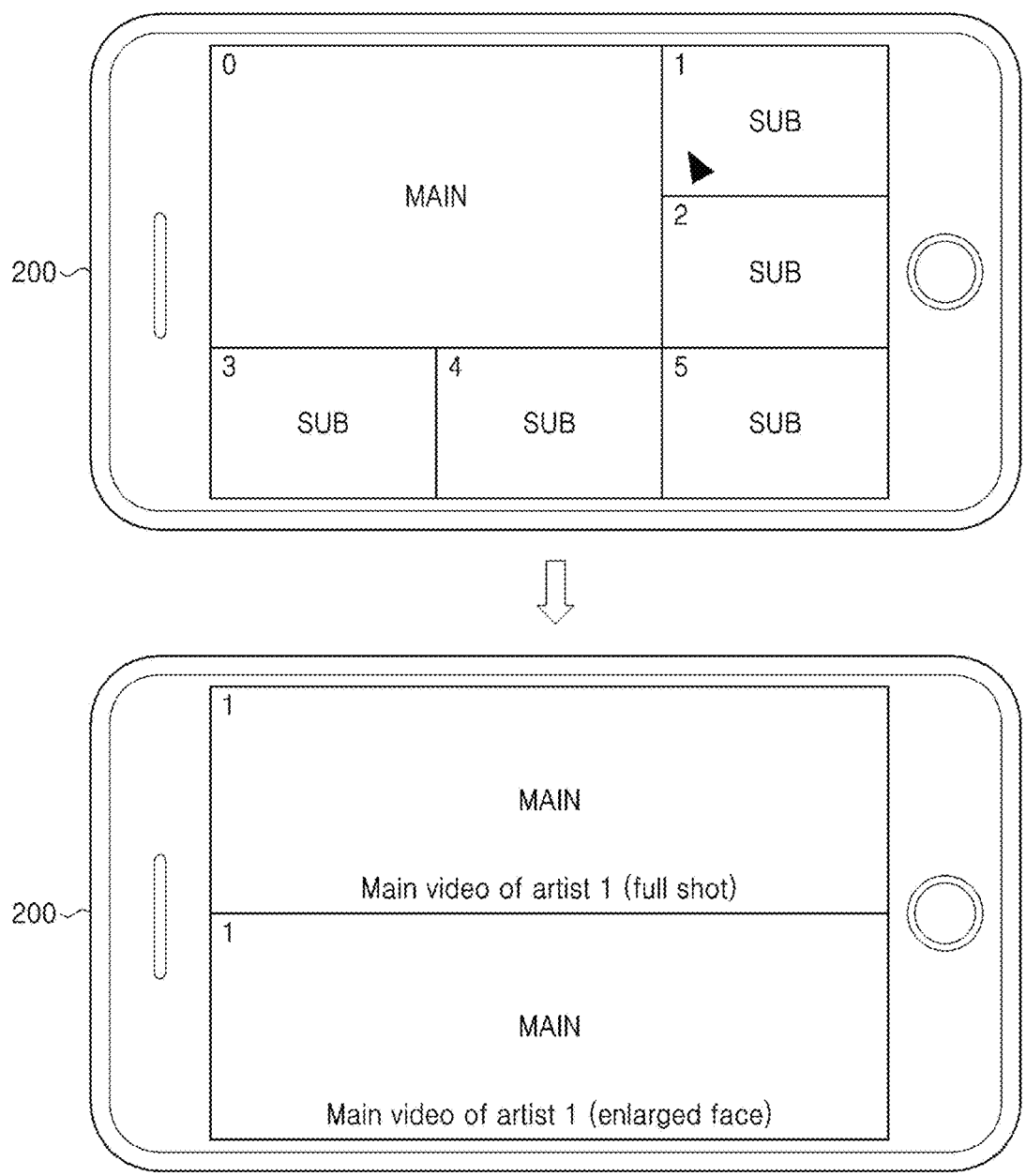

【Figure 14】
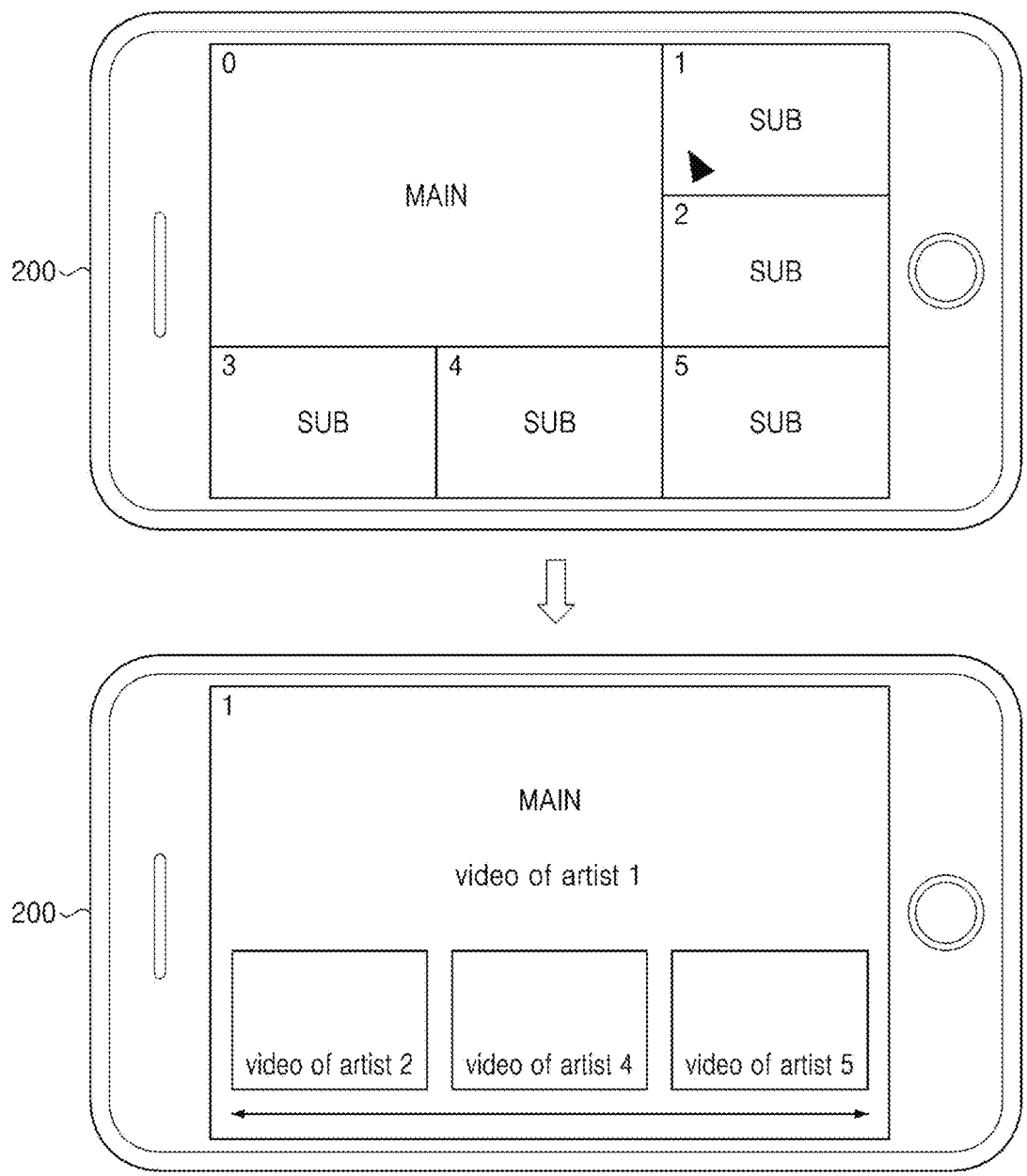

【Figure 15】
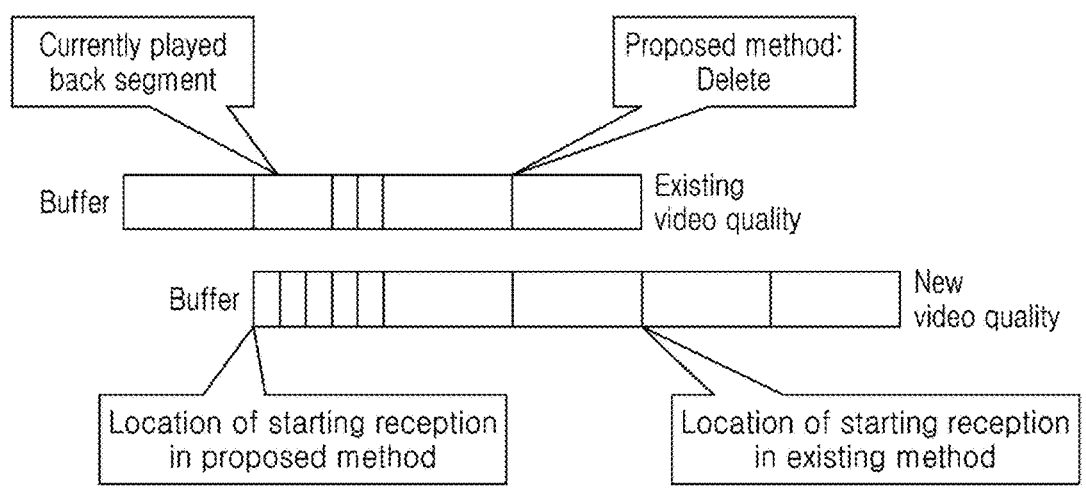

METHOD AND APPARATUS FOR PROVIDING MULTI VIEW SERVICE

CROSS REFERENCE TO RELATED APPLICATION(S)

This application is a National Stage of International Application No. PCT/KR2022/020881 filed on Dec. 20, 2022, claiming priority based on Korean Patent Application No. 10-2021-0184634 filed on Dec. 22, 2021, the disclosures of which are incorporated herein by reference in their entirety.

TECHNICAL FIELD

The present invention relates to a method of providing a multi-view service, and an apparatus for the same. More specifically, the present invention relates to a method of providing a multi-view service, and an apparatus for the same, which can provide a video that can satisfy fan's enthusiasm of a user toward each artist belonging to an artist group.

BACKGROUND ART

As the number of artist groups including several members increases, the number of fans who particularly like a specific artist member is increasing although the fans like the artist group itself, and self-cam videos of only the artist members whom a fan likes, which have been captured or edited by the fan, are actively produced reflecting this trend.

However, since most of the self-cam videos are produced by fans, the video quality is significantly low as the videos are captured in an excessively enlarged state by adjusting the magnification of the camera at a location far from the stage, or many videos are unable to be recognized as the videos are shaken greatly even with a slightest movement of the photographer, and therefore, the self-cam videos are consumed simply by the fan's enthusiasm in reality with all various adverse conditions.

Accordingly, production and broadcasting companies having professional equipment and photographers continuously try to produce high-quality self-cam videos, and it is a method of separately capturing the artist members using individual cameras, in addition to a camera that captures all the members of the artist group, and providing high-quality self-cam videos for each artist member by appropriately editing the captured video.

However, it is since that as there is a problem in that this method is not suitable for real-time live broadcasting, it is difficult to configure a video that shows only one artist member in real-time live broadcasting that many people watch, and as some people may desire to see other artist members, some people may desire to see the entire artist group, or some people may desire to see two or more artist members at the same time, the needs of the people corresponding to viewers are different, and thus it may be desirable to satisfy the common needs of many people rather than to satisfy the needs of a few specific people. Accordingly, as the videos are simply configured by mixing videos capturing the entire artist group and videos capturing an artist currently in charge of the song part in the real-time live broadcasting, the videos may satisfy most of the people to some extent. However, it is somewhat insufficient to satisfy the fan's enthusiasm, i.e., the needs of some people, and at the same time, it is also true that it is difficult to completely feel the vividness of the live scene.

Therefore, it is required to provide a new and innovative broadcasting method that can perfectly satisfy the needs of all people by solving the problems generated according to the simple configuration of the conventional real-time live broadcasting method as described above, and further provide even a vivid sense of liveliness of a live scene.

DISCLOSURE

Technical Problem

The present invention has been made in view of the above problems, and it is an object of the present invention to provide a method of providing a multi-view service and an apparatus for the same, which can perfectly satisfy the needs of all people by solving the problems generated according to the simple configuration of the conventional real-time live broadcasting method.

Another object of the present invention is to provide a method of providing a multi-view service of a new and innovative way and an apparatus for the same, which can provide even a vivid sense of liveliness of a live scene.

The technical problems of the present invention are not limited to the technical problems mentioned above, and unmentioned other technical problems will be clearly understood by those skilled in the art from the following description.

Technical Solution

To accomplish the above objects, according to one aspect of the present invention, there is provided a method of providing a multi-view service, which is performed through an apparatus including a processor and memory, the method comprising the steps of: (a) receiving one or more videos from one or more cameras individually capturing each artist belonging to an artist group; (b) determining a multi-view layout setting on a user's terminal for the received one or more videos; and (c) outputting the received one or more videos on the user's terminal according to the determined multi-view layout setting, and the multi-view layout setting includes a first multi-view layout setting including one main video and one or more sub-videos on one screen, and a second multi-view layout setting including one or more main videos on one screen.

According to an embodiment, the first multi-view layout setting may include a 1-1 multi-view layout setting, and the 1-1 multi-view layout setting may be a setting including the one main video and the one or more sub-videos on one screen, and automatically switching arrangement of the one main video and any one of the one or more sub-videos at a predetermined time interval.

According to an embodiment, the 1-1 multi-view layout setting may be a setting that automatically switches even the arrangement of the other sub-videos when the arrangement of the one main video and any one of the one or more sub-videos is automatically switched.

According to an embodiment, the one main video and the one or more sub-videos may include a preference reflection button that can be selected by a user, and the preference reflection button may be reset at a predetermined time interval to be reselected after being selected once by the user.

According to an embodiment, the one main video and the one or more sub-videos may include a preference reflection button that can be selected by a user, and the preference reflection button may be reset to be reselected at a time point when the arrangement of the one main video and any one of the one or more sub-videos is automatically switched after being selected once by the user.

According to an embodiment, the first multi-view layout setting may include a 1-2 multi-view layout setting, and the 1-2 multi-view layout setting may be a setting including the one main video and the one or more sub-videos on one screen, and switching any one or more among the arrangement of the one main video and any one of the one or more sub-videos and the arrangement of the other sub-videos according to selection of the user.

According to an embodiment, selection of the user may be a method of switching two videos among one main video and one or more sub-videos desired to switch the arrangement by dragging and dropping any one video to the location where the other video is arranged.

According to an embodiment, the first multi-view layout setting may include a 1-3 multi-view layout setting, and the 1-3 multi-view layout setting may be a setting of arranging an artist (singer) currently in charge of a song part on the one main video and an artist (performer) currently in charge of dance on the one or more sub-videos, among artists belonging to the artist group, by analyzing the one or more received videos.

According to an embodiment, when a plurality of artists are currently in charge of the song part, one of the artists may be arranged on the one main video and the other artists on the one or more sub-videos, and the size of the one or more sub-videos on which the other artists are arranged may be set to be the same as the size of the one main video to arrange the sub-videos side by side as main videos.

According to an embodiment, the 2-1 multi-view layout setting may not arrange the artist currently in charge of dance on the one or more sub-videos.

According to an embodiment, when any one artist among the artist currently in charge of the song part and the artist currently in charge of dance is selected by the user, a 2-2 multi-view layout setting that arranges the selected any one artist on one main video and does not include a sub-video may be determined.

According to an embodiment, the second multi-view layout setting may include a 2-3 multi-view layout setting, and the 2-3 multi-view layout setting may be a setting of cropping only faces from videos of top N artists (N is a natural number) among the artists belonging to the artist group according to a popularity vote result, and arranging the faces on one or more main videos, respectively.

According to an embodiment, the second multi-view layout setting may include a 2-4 multi-view layout setting, and the 2-4 multi-view layout setting may be a setting of analyzing, when any one artist is selected by the user among the artists belonging to the artist group, one or more received videos, and arranging a full shot of the selected any one artist on the one main video, and arranging an enlarged face image on another main video.

According to an embodiment, the second multi-view layout setting may include a 2-5 multi-view layout setting, and the 2-5 multi-view layout setting may be a setting for arranging, when any one artist is selected by the user among the artists belonging to the artist group, the selected one artist on one main video as a full screen, and arranging videos of the other artists in an overlay method.

According to an embodiment, the 2-5 multi-view layout setting may be a setting of arranging the videos of the other artists in an overlay method in order of videos most viewed by other users.

According to another aspect of the present invention, there is provided an apparatus for providing a multi-view service, the apparatus comprising: one or more processors; a network interface; a memory for loading a computer program executed by the processor; and a storage for storing large-capacity network data and the computer program, wherein the computer program performs: (A) an operation of receiving one or more videos from one or more cameras individually capturing each artist belonging to an artist group; (B) an operation of determining a multi-view layout setting on a user's terminal for the received one or more videos; and (C) an operation of outputting the received one or more videos on the user's terminal according to the determined multi-view layout setting by the one or more processors, wherein the multi-view layout setting includes a first multi-view layout setting including one main video and one or more sub-videos on one screen, and a second multi-view layout setting including one or more main videos on one screen.

According to another aspect of the present invention, there is provided a computer program stored in a computer-readable medium to execute the steps of: (AA) receiving one or more videos from one or more cameras individually capturing each artist belonging to an artist group; (BB) determining a multi-view layout setting on a user's terminal for the received one or more videos; and (CC) outputting the received one or more videos on the user's terminal according to the determined multi-view layout setting by the one or more processors in combination with a computing device, wherein the multi-view layout setting includes a first multi-view layout setting including one main video and one or more sub-videos on one screen, and a second multi-view layout setting including one or more main videos on one screen

ADVANTAGEOUS EFFECTS

According to the present invention as described above, as the artists belonging to an artist group may be displayed on one screen at the same time, and an artist of a user's favorite may be displayed in a large size on the main video, there is an effect of satisfying at once all the needs of users who like different artist members in a method of real-time live broadcasting, as well as in a method of editing an artist's video and uploading the video to a platform or the like.

In addition, as the multi-view layout setting of various configurations may be freely changed by a service server itself or freely selected by a user, there is an effect of providing the user with a vivid sense of liveliness as if a user is actually in a live scene.

In addition, as a screen that shows an artist of a user's favorite at the center is newly configured by selection of a preference reflection button or by a popularity voting function, there is an effect of perfectly satisfying the fan's enthusiasm.

In addition, as a multi-view service provider is a production company or a broadcasting company having professional equipment and photographers, there is an effect of providing high-quality videos to users.

In addition, as it is possible to receive new video quality video data from the location of an existing video quality segment, and delete existing video quality video data from the buffer and quickly change to the new video quality video data when the received new video quality video data is more than a predetermined amount, and an icon for the time required to change the video quality is separately displayed, there is an effect of considering even the user's convenience.

The effects of the present invention are not limited to the effects mentioned above, and unmentioned other effects will be clearly understood by those skilled in the art from the following description.

DESCRIPTION OF DRAWINGS

FIG. 1 is a view showing an overall configuration included in an apparatus for providing a multi-view service according to a first embodiment of the present invention.

FIG. 2 is a flowchart illustrating representative steps of a method of providing a multi-view service according to a second embodiment of the present invention.

FIG. 3 is a view exemplarily showing a first multi-view layout setting when the number of artists belonging to an artist group is six in a method of providing a multi-view service according to a second embodiment of the present invention.

FIG. 4 is view 1 exemplarily showing a 1-1 multi-view layout setting.

FIG. 5 is view 2 exemplarily showing a 1-1 multi-view layout setting.

FIG. 6 is view 1 exemplarily showing a 1-2 multi-view layout setting.

FIG. 7 is view 2 exemplarily showing a 1-2 multi-view layout setting.

FIG. 8 is a view exemplarily showing a 1-3 multi-view layout setting.

FIG. 9 is view 1 exemplarily showing a 2-1 multi-view layout setting.

FIG. 10 is view 2 exemplarily showing a 2-1 multi-view layout setting.

FIG. 11 is a view exemplarily showing a 2-2 multi-view layout setting.

FIG. 12 is a view exemplarily showing a 2-3 multi-view layout setting.

FIG. 13 is a view exemplarily showing a state of beginning a 2-4 multi-view layout setting.

FIG. 14 is a view exemplarily showing a state of beginning a 2-5 multi-view layout setting.

FIG. 15 is a view exemplarily showing a state of a player buffer related to change of video quality.

MODE FOR INVENTION

Details of the objects and technical configurations of the present invention and operational effects according thereto will be more clearly understood by the following detailed description based on the drawings attached in the specification of the present invention. An embodiment according to the present invention will be described in detail with reference to the accompanying drawings.

The embodiments disclosed in this specification should not be construed or used as limiting the scope of the present invention. For those skilled in the art, it is natural that the description including the embodiments of the present specification have various applications. Accordingly, any embodiments described in the detailed description of the present invention are illustrative for better describing of the present invention, and are not intended to limit the scope of the present invention to the embodiments.

The functional blocks shown in the drawings and described below are merely examples of possible implementations. Other functional blocks may be used in other implementations without departing from the spirit and scope of the detailed description. In addition, although one or more functional blocks of the present invention are expressed as separate blocks, one or more of the functional blocks of the present invention may be combinations of various hardware and software configurations that perform the same function.

In addition, the expressions including certain components are expressions of "open type" and only refer to existence of corresponding components, and should not be construed as excluding additional components.

Furthermore, when a certain component is referred to as being "connected" or "coupled" to another component, it may be directly connected or coupled to another component, but it should be understood that other components may exist in between.

Hereinafter, each embodiment of the present invention will be described with reference to the drawings.

FIG. 1 is a view showing an overall configuration included in an apparatus for providing a multi-view service 100 according to a first embodiment of the present invention.

However, this is only a preferred embodiment for achieving the objects of the present invention, and it is apparent that some components may be added or deleted as needed, and a function performed by any one component may be performed by another component together.

The apparatus 100 for providing a multi-view service according to a first embodiment of the present invention may include a processor 10, a network interface 20, a memory 30, a storage 40, and a data bus 50 for connecting these components. It is apparent that additional components required in achieving the objects of the present invention may be further included.

The processor 10 controls the overall operation of each component. The processor 10 may be any one among a central processing unit (CPU), a microprocessor unit (MPU), a microcontroller unit (MCU), and a type of processor widely known in the art to which the present invention belongs. In addition, the processor 10 may perform an operation on at least one application or program for performing the method of providing a multi-view service according to a second embodiment of the present invention.

The network interface 20 supports wired/wireless Internet communication of the apparatus 100 for providing a multi-view service according to a first embodiment of the present invention, and may support other known communication methods. Accordingly, the network interface 20 may be configured to include a communication module corresponding thereto.

The memory 30 may store various information, commands and/or information, and load one or more computer programs 41 from the storage 40 to perform the method of providing a multi-view service according to a second embodiment of the present invention. Although RAM is shown in FIG. 1 as a kind of the memory 30, it is apparent that various storage media may be used as the memory 30.

The storage 40 may non-temporarily store one or more computer programs 41 and large-scale network information 42. The storage 40 may be any one among non-volatile memory such as read only memory (ROM), erasable programmable ROM (EPROM), electrically erasable programmable ROM (EEPROM), flash memory or the like, a hard disk, a removable disk, and any type of computer-readable recording medium widely known in the art to which the present invention belongs.

The computer program 41 is loaded on the memory 30, and performs (A) an operation of receiving one or more videos from one or more cameras individually capturing each artist belonging to an artist group; (B) an operation of determining a multi-view layout setting on a user's terminal for the received one or more videos; and (C) an operation of outputting the received one or more videos on the user's terminal according to the determined multi-view layout setting by the one or more processors 10, and the multi-view layout setting may include a first multi-view layout setting including one main video and one or more sub-videos on one screen, and a second multi-view layout setting including one or more main videos on one screen.

The operation performed by the computer program 41 mentioned above may be regarded as a function of the computer program 41, and a more detailed description will be provided below in the description of the method of providing a multi-view service according to a second embodiment of the present invention.

The data bus 50 functions as a passage of commands and/or information among the processor 10, the network interface 20, the memory 30, and the storage 40 described above.

The apparatus 100 for providing a multi-view service according to a first embodiment of the present invention described above may be a server having a network function, and may be a practical implementation form such as a tangible physical server like an in-house system or a space rental system, an intangible cloud, or the like, and the operating subject may be a production company or a broadcasting company, which is a multi-view service provider.

In addition, the apparatus 100 for providing a multi-view service according to a first embodiment of the present invention may be a user's terminal 200 having a network function, as well as a server, and it is since that the user's terminal may perform operations comparable to those of the server as performance of the user's terminal is dramatically improved recently. For example, the user's terminal may be a portable terminal such as a smartphone, PDA, PDP, tablet PC, smart watch, smart glass, notebook PC, or the like, or may be an installation-type terminal such as a desktop PC, a kiosk, or the like.

Hereinafter, a method of providing a multi-view service according to a second embodiment of the present invention will be described with reference to FIGS. 2 to 14 on the premise that the apparatus 100 for providing a multi-view service according to a first embodiment of the present invention is a server of a multi-view service provider (hereinafter, referred to as a "service server").

FIG. 2 is a flowchart illustrating representative steps of a method of providing a multi-view service according to a second embodiment of the present invention.

However, this is only a preferred embodiment in achieving the objects of the present invention, and it is apparent that some steps may be added or deleted as needed, and any one step may be performed to be included in another step.

First, the service server 100 receives one or more videos from one or more cameras individually capturing each artist belonging to an artist group (S210).

Here, the number of artists belonging to an artist group is not limited, and since one camera should capture only one artist, the number of artists and the number of cameras may be 1:1, and the number of cameras preferably exceeds the number of artists since videos such as a full shot or the like of the entire artist group may also be provided.

On the other hand, although videos may be received in real time, in the case of real-time live broadcasting, the videos may be received at an interval of 10 seconds to 1 minute to prevent unintended broadcast accidents, and in the case of a method that edits and uploads artist's videos to a platform or the like, whether or not to receive in real-time may not be a problem.

When videos are received, the service server 100 determines a multi-view layout setting on the user's terminal 200 for one or more received videos (S220).

Since the multi-view layout setting on the user's terminal 200 is the core technical feature of the present invention, it may include a first multi-view layout setting including one main video and one or more sub-videos on one screen and a second multi-view layout setting including one or more main videos on one screen, and detailed description thereof will be provided below.

Here, the first multi-view layout setting and the second multi-view layout setting may be basic default settings for outputting videos on the user's terminal 200 at step S230 described below. Determining a multi-view layout setting at step S220 is adjusting in detail the basic default settings of the first multi-view layout setting and the second multi-view layout setting according to the number of artists belonging to an artist group. When the first multi-view layout setting is applied to an artist group of six artists, it may be regarded as adjusting in detail the first multi-view layout setting to include one main video and five sub-videos on one screen, and when the first multi-view layout setting is applied, it may be regarded as adjusting in detail the second multi-view layout setting to include one main vocal artist belonging to the artist group on one screen as one main video.

On the other hand, since the user's terminal 200 should output a video at step S230 described below according to the determined multi-view layout setting, a multi-view service dedicated application for partitioning a plurality of screens into a grid should be installed. All the descriptions on the user's terminal 200 or through the user's terminal 200 to be mentioned below should be regarded as being effective while the multi-view service dedicated application installed in the user's terminal 200 is executed.

When a multi-view layout setting is determined, the service server 100 outputs one or more received videos on the user's terminal 200 according to the determined multi-view layout setting (S230).

Although output of the videos on the user's terminal 200 at step S230 is based on the multi-view layout setting determined at step S220, since no selection is received from the user in relation to the multi-view layout setting at step S220, the multi-view layout setting at step S230 may be regarded as a default setting, and the basic default setting may be any one among the first multi-view layout setting and the second multi-view layout setting as described above, and in addition to these, a full shot of the entire artist group may also be a basic default setting.

On the other hand, videos according to the basic default setting are output on the user's terminal 200 as step S230 is performed immediately after step S210 without performing step S220 of determining the multi-view layout setting on the user's terminal 200, and thereafter, a multi-view video may be output as a multi-view service start command or the like is received from the user.

As described, whether videos are output after a multi-view layout setting is determined on the user's terminal 200 or a multi-view service start command is received from the user after the received video is directly output on the user's terminal 200, there is no big difference in the appearance of the provided multi-view service, and hereinafter, a multi-view layout setting, which is the core technical feature of the present invention, will be described.

FIG. 3 is a view exemplarily showing a first multi-view layout setting when the number of artists belonging to an artist group is six and the user's terminal 200 is a smartphone in a method of providing a multi-view service according to a second embodiment of the present invention.

Referring to FIG. 3, it may be confirmed that one video labeled "MAIN" together with number 0 and five videos labeled "SUB" together with numbers 1 to 5 are displayed on one screen, and the difference between the main video and the sub-videos may be the size of the videos output on the user's terminal 200, and as the main video is arranged near the center of the screen compared to the sub-videos, it has the advantage of easily attracting user's attention.

As for the size of the main video and the sub-videos, the horizontal and vertical ratio is the same, and when the videos are configured such that the sum of four sub-videos is equal to one main video, i.e., the ratio of size between the main video and the sub-video is 4:1, the attention is naturally focused on the main video, and at the same time, sub-videos may be seen easily as the size of the sub-videos is not too small, and it is not necessarily limited thereto, but the ratio of the size of the main video to the size of the sub-videos may be freely adjusted according to setting of the multi-view service provider or setting of the user.

On the other hand, the number of sub-videos arranged in the first multi-view layout setting will not make a difference as long as one main video and one or more sub-videos are included on one screen, and the videos shown in FIG. 3 may be a representative example of the first multi-view layout setting.

Specifically, the first multi-view layout setting may include a 1-1 multi-view layout setting, a 1-2 multi-view layout setting, and a 1-3 multi-view layout setting, and it will be described below starting from the 1-1 multi-view layout setting.

The 1-1 multi-view layout setting is a setting including one main video and one or more sub-videos on one screen, and automatically switching the arrangement of the one main video and any one of the one or more sub-videos at a predetermined time interval.

Here, although the predetermined time may be freely selected according to setting of the multi-view service provider or setting of the user, it would be desirable to give the user enough time to focus on watching the videos by setting the time to 3 to 5 minutes, and the 1-1 multi-view layout setting may be a setting that automatically switches even the arrangement of the other sub-videos as shown in FIG. 5, as well as the arrangement of the one main video and any one of the one or more sub-videos as shown in FIG. 4.

Referring to FIG. 4, it may be confirmed that the arrangement of sub-video 1 and main video 0 (lower part) is switched in the multi-view layout setting shown in FIG. 3 (upper part), and referring to FIG. 5, it may be confirmed that the arrangement of sub-video 2 and sub-video 5 (lower part) is switched, at the same time as the arrangement of sub-video 1 and main video 0 (lower part) is switched.

Since the 1-1 multi-view layout setting sequentially or randomly outputs each artist belonging to an artist group on the main video at a predetermined time interval, when a user prefers the artists comparatively equally, rather than particularly anyone among the artists belonging to the artist group, or when several users who prefer different artists are watching the video together, it may be regarded as the most desirable multi-view layout setting.

Meanwhile, referring to FIGS. 4 and 5 again, it may be confirmed that a heart-shaped preference reflection button is included in the lower right corner of the main video and the sub-videos, in which some buttons are shaped as an empty transparent heart, and others are shaped as a filled heart. The former one means a state indicating that the video has not been selected by the user, and the latter one means a state indicating that the video is selected by the user.

The preference reflection button may be reset at a predetermined time interval to be reselected after being selected once by the user, and it means that when the predetermined time is 3 minutes, the preference reflection button may not be reselected until 3 minutes are elapsed after the preference reflection button is selected, and therefore, it may be regarded as a setting that has nothing to do with the interval of automatically switching the arrangement of the one main video and any one of the one or more sub-videos.

Furthermore, the preference reflection button may be reset to be reselected at the time point of automatically switching the arrangement of the one main video and any one of the one or more sub-videos after being selected once by the user, and it means that when the predetermined time is 3 minutes, and the preference reflection button is selected at the time point of 1 minute after the arrangement of the one main video and any one of the one or more sub-videos is automatically switched, it can be reselected only after 2 minutes, and therefore, it may be regarded as a setting related to the interval of automatically switching the arrangement of the one main video and any one of the one or more sub-videos.

As the preference reflection button is provided in this way, the user may cast a kind of popularity vote for an artist that the user prefers while watching the video, and the service server 100 may collect and analyze vote information to change the arrangement of the video accordingly, and this will be described below.

The 1-2 multi-view layout setting is a setting including one main video and one or more sub-videos on one screen, and switching any one or more among the arrangement of the one main video and any one of the one or more sub-videos and the arrangement of the other sub-videos according to selection of the user.

Here, selection of the user may be a method of switching two videos including one main video and one or more sub-videos desired to switch the arrangement by dragging and dropping any one video to the location where the other video is arranged, and referring to FIG. 6, it may be confirmed that in the multi-view layout setting (upper part) shown in FIG. 3, the arrangement of sub-video 1 and main video 0 is switched by dragging and dropping sub-video 1 to the location of main video 0 (lower part), and referring to FIG. 7, it may be confirmed that the arrangement of sub-video 1 and main video 0 is switched, and at the same time, the arrangement of the other sub-videos is automatically switched (lower part) by dragging and dropping sub-video 1 to the location of main video 0.

In addition to the drag and drop method, when the user's terminal 200 is a smartphone or the like supporting a touch function, for two videos including one the main video and any one of the one or more sub-videos desired to switch the arrangement, it is also possible to adopt a method of automatically changing the arrangement by selecting one video by pressing the video with a relatively high pressure and then selecting another video desired to be switched in the same way, and it is apparent that any one among all known video switching methods may be used.

On the other hand, selection of the user may be selection of a preference reflection button of which the description has been suspended. The service server 100 may analyze an artist for whom the user has selected the preference reflection button the most for a predetermined time period, and automatically change the arrangement of the videos so that the corresponding artist may be output on the main video.

Here, the predetermined time may vary according to the type of video, and in the case of real-time live broadcasting, since each song is relatively short as along as about 3 to 5 minutes, it will be desirable to set the predetermined time for analyzing the user's preference to around 1 minute, and display the user's preferred artist on the main video for the rest of the time, and in the case of a concert video, since one artist group makes performance on the stage for a relatively long time of 1.5 to 2 hours, it will be desirable to set the predetermined time for analyzing the user's preference to around 20 minutes, and display the user's preferred artist on the main video for the rest of the time. However, since the predetermined time for analyzing the user's preference and the predetermined time for resetting the preference reflection button selected once should be linked in both of the cases, when the predetermined time for resetting the preference reflection button selected once is 3 minutes while the predetermined time for analyzing the user's preference is 1 minute, as the user may select the preference reflection button at most once within the predetermined time for analyzing the user's preference, it is desirable that the service server 100 constructs an environment for the user to sufficiently make a selection for analyzing the user's preference within the former predetermined time by setting the latter predetermined time to be shorter than the former predetermined time. In addition, the predetermined time according to the type of video may also be freely changed according to setting of the multi-view service provider or setting of the user.

The 1-3 multi-view layout setting is a setting of arranging an artist (singer) currently in charge of the song part on one main video and an artist (performer) currently in charge of dance on the one or more sub-videos, among the artists belonging to an artist group by analyzing one or more received videos.

As the 1-3 multi-view layout setting is a layout setting according to an artificial intelligence video analysis function, the video analysis may also be performed at the same time by implementing the artificial intelligence video analysis function in the service server 100 itself. However, in the case of real-time live broadcasting, since the multi-view service may not be smoothly provided due to computational overload or the like of the processor 10 according to high-definition video analysis, the service server 100 may receive a video analysis result from an external server (not shown) dedicated to video analysis, and arrange videos of artists on one main video and one or more sub-videos according to a result of analyzing the received video, and output the videos on the user's terminal 200.

This will be explained with an example. When it is assumed that artists in an artist group including six artists are named as artist 1 to artist 6, and an artist currently in charge of the song part is artist 2, according to the 1-3 multi-view layout setting as shown in FIG. 8, artist 2 may be output on the main video and the other artists on the sub-videos, and when the part of artist 3 begins after the part of artist 2 is finished, artist 3 may be output on the main video, and artist 2 and the rest of the artists may be output on the sub-videos, and it is apparent that arrangement of the other artists may also be switched when the artist in charge of the song part is switched onto the main video.

On the other hand, several artists may be in charge of the song part at the same time in many cases, such as the climax or the like of a song, and in this case, which artist is to be arranged on the one main video may be a problem. In this case, one of the artists is arranged on the one main video and the other artists on the one or more sub-videos, respectively, and the size of the one or more sub-videos on which the other artists are arranged is set to be the same as the size of the one main video to arrange the sub-videos side by side as main videos, and such a layout setting is the 2-1 multi-view layout setting.

The second multi-view layout setting described above is a setting that includes one or more main videos on one screen, and as it is described that the difference between the main video and the sub-videos is the size of the videos, changing the one or more sub-videos to be the main videos by setting the size of the one or more sub-videos to be the same as the size of the one main video is the 2-1 multi-view layout setting.

Referring to FIG. 9, under the premise that artist 2 in charge of the song part is on main video 0, and the other artists, i.e., artist 1, artist 3, and artist 4 to artist 6, are output on sub-videos 1 to 5 (upper part) in the multi-view layout setting shown in FIG. 3, when a song part, in which artist 1, artist 3, and artist 4 harmonize with artist 2, begins in the directly connected part, the 2-1 multi-view layout setting begins to include the videos of artist 1, artist 2, artist 3, and artist 4 on one screen in the same size as shown in the lower part of FIG. 9. In this case, although artist 1, artist 3, and artist 4 are arranged on the sub-videos before, as the sub-videos are changed to a size the same as the size of the main video where artist 2 is arranged, it may be regarded as practically arranging the artists on the main videos, and as an artist in charge of dance behind the artist in charge of the song part may not be arranged on the one or more sub-videos, the user may focus more on the artists currently in charge of the song.

On the other hand, FIG. 10 exemplarily shows a case of beginning a song part in which three artists harmonize unlike FIG. 9, and it may be confirmed that although the videos of the three artists are output as videos of the same size like the case of FIG. 8, the layout of the main videos is different from that of FIG. 8 as the number of main videos is different from that of FIG. 8, and the service server 100 may configure the 2-1 multi-view layout setting by optimizing the size and layout of the main videos according to the number of artists in charge of the song part.

When any one artist among the artist currently in charge of the song part and the artist currently in charge of dance is selected by the user, the 2-2 multi-view layout setting that arranges the selected any one artist on one main video and does not include a sub-video may begin, and describing it simply, the 2-2 multi-view layout setting relates to a so-called single full screen in which one main video is output as a full image.

The 2-2 multi-view layout setting is selecting any one artist among the artist currently in charge of the song part and the artist currently in charge of dance by the user, and describing it simply, it means selecting any one among the artists belonging to the artist group that the user desires to see in a full screen, and since there are many operations related to "selection" in the multi-view service described above, selection for beginning the 2-2 multi-view layout setting should be distinguished from the previous selections.

Accordingly, selection for beginning the 2-2 multi-view layout setting may adopt a method of quickly selecting (double-clicking) a video of an artist that the user desires to view in a full screen, a method of touching two fingers attached to each other on the smartphone and detaching the fingers to be spaced apart from each other when a touch function is supported, or the like, and FIG. 11 is a view showing an example of the 2-2 multi-view layout setting that begins according to the double-click method corresponding to the former method.

On the other hand, since the 2-2 multi-view layout setting is a single full screen setting showing only one main video, a user who desires to see a video of another artist on the user's terminal 200 that supports the touch function may switch the videos by swiping left and right, and as a list of other artists' videos is exposed by edge-swiping the left and right of the bottom of the video, and an artist preferred by the user is exposed at the top of the list by selecting any one that the user desires to see as a single full screen from the list or by adjusting the order of the videos of the other artist included in the list, user's convenience may be improved.

The 2-3 multi-view layout setting is a setting of cropping only faces from the videos of top N artists (N is a natural number) among the artists belonging to the artist group according to a popularity vote result, and arranging the faces on one or more main videos, respectively.

Although the 2-3 multi-view layout setting is the same as the 2-1 multi-view layout setting in that it includes only one or more main videos, there is a difference in that the setting is specialized for the popularity voting function and only the faces of the artists are cropped from the videos and arranged on the main videos, and the popularity voting function is also distinguished from selection of the preference reflection button described above in the 1-1 multi-view layout setting.

The service server 100 may provide the user with a popularity voting function in which an available voting time is set while outputting the multi-view video on the user's terminal 200, and may aggregate voting results within the available voting time and output a video according to the 2-3 multi-view layout setting.

In addition, since the multi-view service may not be smoothly provided like the 1-3 multi-view layout setting due to computational overload of the processor 10 as a consequence of aggregation of voting results or the like, the service server 100 may receive the aggregated voting result from an external server (not shown) dedicated to providing a popular voting function and aggregating voting results, and output a video on the user's terminal 200 in accordance with the 1-3 multi-view layout setting on the basis of the received voting result.

FIG. 12 is a view exemplarily showing a 2-3 multi-view layout setting according to the popular voting function, in which an icon related to the popularity voting function is displayed at the upper right corner of the multi-view layout setting shown in the upper part, and the artists who ranked 1st, 2nd, and 3rd are displayed from the left to the right in the lower part according to the voting result, and the number of artists and the view of arranging the artists included on one screen may also be freely changed according to setting of the multi-view service provider or setting of the user.

The 2-4 multi-view layout setting is a setting of analyzing, when any one artist is selected by the user among the artists belonging to the artist group, one or more received videos, and arranging a full shot of the selected any one artist on one main video, and arranging an enlarged face image on another main video.

Although the 2-4 multi-view layout setting is the same as the 2-2 multi-view layout setting in that only one artist is arranged on the video, there is a difference in that there are two main videos showing a full shot and an enlarged face of the artist, and since it is a kind of split-view setting, the corresponding artist may be viewed from multiple angles at the same time, so that it corresponds to a multi-view layout setting that perfectly satisfies fan's enthusiasm, and this is shown in FIG. 13 as an example.

On the other hand, the 2-4 multi-view layout setting is a layout setting that may begin when a specific artist is selected by the user like the 2-2 multi-view layout setting, and although it may be implemented to begin any one layout setting among two layout settings by making a difference in the method of being selected, in the case of selecting a specific artist to construct an easier user interface (UI) environment, it may be implemented to output a pop-up window or the like so that the user may select whether to start the 2-2 multi-view layout setting or the 2-4 multi-view layout setting.

The 2-5 multi-view layout setting is a setting for arranging, when any one artist is selected by the user among the artists belonging to the artist group, the selected one artist on one main video as a full screen, and arranging videos of the other artists in an overlay method, and this is shown in FIG. 14 as an example.

Although the 2-5 multi-view layout setting is the same as the 2-2 multi-view layout setting in that only one artist is arranged on the video, there is a difference in that videos of the other artists are arranged on the main video in an overlay method. The videos of the other artists arranged on the main video may be scrolled according to the number of the videos, and the service server 100 may collect information on the videos of artists that users are watching or information on selection of the preference reflection button in real time, and arrange the videos of the other artists arranged in an overlay method in order of videos most viewed by the users or in order of selecting the preference reflection button.

On the other hand, since the videos of the other artists arranged in an overlay method are arranged in the lower part of the main video and may hinder watching the main video, it may be implemented to naturally lead to the 2-5 multi-view layout setting from the 2-2 multi-view layout setting by allowing the videos of an overlay method to be arranged only when the user selects or touches the lower part of the main video, and it will be possible to arrange the videos in an overlay method considering the user's intention by separately implementing a PIN function that may fix the videos of the other artists arranged in an overlay method.

As all the multi-view layout settings described above, more specifically, the 1-1 to 1-3 multi-view layout settings, and the 2-1 to 2-5 multi-view layout settings, include one main video, although it is not particularly required when arrangement is switched between sub-videos, in the case where arrangement of any one of the sub-videos and the main video is switched, the video quality of the camera needs to be changed as the video size increases. In this case, referring to FIG. 15, in comparison with the existing method of outputting all the existing quality video data stored in the player buffer and then outputting the changed new quality video data, in the present invention, in order to quickly perform video quality conversion, new quality video data may be received from the existing quality segment position, and when data of a predetermined amount or more is received, the existing quality video data is deleted from the buffer and may be quickly changed to new quality video data, and as the segment is divided into smaller chunks and transmitted using the CMAF format, the video quality may be changed more quickly in chunk units.

In addition, even the user convenience may be considered by separately displaying a loading icon on the lower left or right side of the video to be changed so that the user himself or herself may confirm the time required to change the video quality.

In addition, although changes in the settings between the 1-1 to 1-3 multi-view layout settings and the 2-1 to 2-5 multi-view layout settings described above may be changed by the user's linking operation or the like in the case of layout settings linked to each other by additionally considering the user's convenience, even when the arrangement settings are not linked to each other, it is desirable to implement to change the layout to a desired layout setting at any time by providing a separate layout setting change menu.

Until now, the method of providing a multi-view service according to a second embodiment of the present invention has been described. According to the present invention, as the artists belonging to an artist group may be displayed on one screen at the same time, and an artist of a user's favorite may be displayed in a large size on the main video, all the needs of users who like different artist members may be satisfied at once in a method of real-time live broadcasting, as well as in a method of editing an artist's video and uploading the video to a platform or the like. In addition, as the multi-view layout setting of various configurations may be freely changed by a service server itself or freely selected by a user, the user may be provided with a vivid sense of liveliness as if a user is actually in a live scene. In addition, as a screen that shows an artist of a user's favorite at the center is newly configured by selection of a preference reflection button or by a popularity voting function, the fan's enthusiasm may be perfectly satisfied. In addition, as a multi-view service provider is a production company or a broadcasting company having professional equipment and photographers, it is possible to provide high-quality videos to users. In addition, as it is possible to receive new video quality video data from the location of an existing video quality segment, and delete existing video quality video data from the buffer and quickly change to the new video quality video data when the received new video quality video data is more than a predetermined amount, and an icon for the time required to change the video quality is separately displayed, even the user's convenience may be considered.

Meanwhile, the apparatus 100 for providing a multi-view service according to a first embodiment of the present invention and the method for providing a multi-view service according to a second embodiment of the present invention may be implemented as a computer program stored in a computer-readable medium according to a third embodiment of the present invention equally including all technical features, and in this case, the method may execute the steps of (AA) receiving one or more videos from one or more cameras individually capturing each artist belonging to an artist group; (BB) determining a multi-view layout setting on a user's terminal for the received one or more videos; and (CC) outputting the received one or more videos on the user's terminal according to the determined multi-view layout setting by the one or more processors in combination with a computing device, and although it has not been described in detail to avoid redundancy, it is apparent that all technical features applied to the apparatus 100 for providing a multi-view service according to a first embodiment of the present invention and the method for providing a multi-view service according to a second embodiment of the present invention may be equally applied to the computer program stored in the computer-readable medium according to a third embodiment of the present invention.

Although the embodiments of the present invention have been described above with reference to the accompanying drawings, those skilled in the art may understand that the present invention may be implemented in other specific forms without changing the technical spirit or essential features. Therefore, it should be understood that the embodiments described above are illustrative and not restrictive in all respects.

10: Processor 20: Network interface 30: Memory 40: Storage

41: Computer program 50: Information bus 100: Service server

200: User's terminal

The invention claimed is:

1. A method of providing a multi-view service through an apparatus including a processor and memory, the method comprising:
   (a) receiving one or more videos from one or more cameras individually capturing each artist belonging to an artist group;
   (b) determining a multi-view layout setting on a user's terminal for the received one or more videos; and
   (c) outputting the received one or more videos on the user's terminal according to the determined multi-view layout setting, wherein
   the multi-view layout setting includes a first multi-view layout setting including one main video and one or more sub-videos on one screen, and a second multi-view layout setting including one or more main videos on one screen,
   wherein the first multi-view layout setting includes a 1-3 multi-view layout setting, wherein the 1-3 multi-view layout setting is a setting of arranging an artist (singer) currently in charge of a song part on the one main video and an artist (performer) currently in charge of dance on the one or more sub-videos, among artists belonging to the artist group, by analyzing the one or more received videos,
   wherein the second multi-view layout setting includes a 2-1 multi-view layout setting in which: when a plurality of artists are currently in charge of the song part, one of the plurality of artists is arranged on one main video and the other artists are arranged on one or more other main videos, and a size of the one or more other main videos on which the other artists are arranged is set to be the same as the size of the one main video to arrange the other main videos side by side with the one main video or in a grid layout along with the one main video.

2. The method according to claim 1, wherein the first multi-view layout setting includes a 1-1 multi-view layout setting, wherein the 1-1 multi-view layout setting is a setting including the one main video and the one or more sub-videos on one screen, and automatically switching arrangement of the one main video and any one of the one or more sub-videos at a predetermined time interval.

3. The method according to claim 2, wherein the 1-1 multi-view layout setting is a setting that automatically further switches the arrangement of the other sub-videos when the arrangement of the one main video and any one of the one or more sub-videos is automatically switched.

4. The method according to claim 2, wherein the one main video and the one or more sub-videos include a preference reflection button that can be selected by a user, and the preference reflection button is reset at a predetermined time interval to be reselected after being selected once by the user.

5. The method according to claim 2, wherein the one main video and the one or more sub-videos include a preference reflection button that can be selected by a user, and the preference reflection button is reset to be reselected at a time point when the arrangement of the one main video and any one of the one or more sub-videos is automatically switched after being selected once by the user.

6. The method according to claim 1, wherein the first multi-view layout setting includes a 1-2 multi-view layout setting, wherein the 1-2 multi-view layout setting is a setting including the one main video and the one or more sub-videos on one screen, and switching any one or more among the arrangement of the one main video and any one of the one or more sub-videos and the arrangement of the other sub-videos according to selection of the user.

7. The method according to claim 6, wherein selection of the user corresponds to a means for switching two videos among one main video and one or more sub-videos desired to switch the arrangement by dragging and dropping any one video to a location where the other video is arranged.

8. The method according to claim 1, wherein the 2-1 multi-view layout setting does not arrange an artist currently in charge of dance in the one or more sub-video.

9. The method according to claim 1, wherein when any one artist among the artist currently in charge of the song part and the artist currently in charge of dance is selected by the user, a 2-2 multi-view layout setting that arranges the selected any one artist on one main video on the screen and does not include a sub-video is determined.

10. The method according to claim 1, wherein the second multi-view layout setting includes a 2-3 multi-view layout setting, wherein the 2-3 multi-view layout setting is a setting of cropping only faces from videos of top N artists (N is a natural number) among the artists belonging to the artist group according to a popularity vote result, and arranging the faces on one or more main videos, respectively.

11. The method according to claim 10, wherein one or more videos received from one or more cameras includes any one of a full shot of the artist group or a sub shot of each artist belonging to the artist group, and wherein the 2-3 multi-view layout setting is a setting of searching top N artists according to a popularity vote result by analyzing at least one of the full shot and the sub shot, cropping faces from videos of the top N artists, and arranging the faces on one or more main videos, respectively.

12. The method according to claim 1, wherein the second multi-view layout setting includes a 2-4 multi-view layout setting, wherein the 2-4 multi-view layout setting is a setting of analyzing, when any one artist is selected by the user among the artists belonging to the artist group, one or more received videos, and arranging a full shot of the selected any one artist on the one main video, and arranging an enlarged face image on another main video.

13. The method according to claim 1, wherein the second multi-view layout setting includes a 2-5 multi-view layout setting, wherein the 2-5 multi-view layout setting is a setting for arranging, when any one artist is selected by the user among the artists belonging to the artist group, the selected one artist on one main video as a full screen, and overlaying videos of the other artists on the one main video.

14. The method according to claim 13, wherein the 2-5 multi-view layout setting is a setting of overlaying the videos of the other artists in order of videos most viewed by other users.

15. An apparatus for providing a multi-view service, the apparatus comprising:
one or more processors;
a network interface;
a memory for loading a computer program executed by the processor; and
a storage for storing large-capacity network data and the computer program, wherein the computer program performs:
(A) an operation of receiving one or more videos from one or more cameras individually capturing each artist belonging to an artist group;
(B) an operation of determining a multi-view layout setting on a user's terminal for the received one or more videos; and
(C) an operation of outputting the received one or more videos on the user's terminal according to the determined multi-view layout setting by the one or more processors, wherein
the multi-view layout setting includes a first multi-view layout setting including one main video and one or more sub-videos on one screen, and a second multi-view layout setting including one or more main videos on one screen,
wherein the first multi-view layout setting includes a 1-3 multi-view layout setting, wherein the 1-3 multi-view layout setting is a setting of arranging an artist (singer) currently in charge of a song part on the one main video and an artist (performer) currently in charge of dance on the one or more sub-videos, among artists belonging to the artist group, by analyzing the one or more received videos,
wherein the second multi-view layout setting includes a 2-1 multi-view layout setting in which: when a plurality of artists are currently in charge of the song part, one of the plurality of artists is arranged on one main video and the other artists are arranged on one or more other main videos, and a size of the one or more other main videos on which the other artists are arranged is set to be the same as the size of the one main video to arrange the other main videos side by side with the one main video or in a grid layout along with the one main video.

16. A computer program stored in a non-transitory computer-readable medium, the program comprising:
(AA) receiving one or more videos from one or more cameras individually capturing each artist belonging to an artist group;
(BB) determining a multi-view layout setting on a user's terminal for the received one or more videos; and
(CC) outputting the received one or more videos on the user's terminal according to the determined multi-view layout setting, wherein
the multi-view layout setting includes a first multi-view layout setting including one main video and one or more sub-videos on one screen, and a second multi-view layout setting including one or more main videos on one screen,
wherein the first multi-view layout setting includes a 1-3 multi-view layout setting, wherein the 1-3 multi-view layout setting is a setting of arranging an artist (singer) currently in charge of a song part on the one main video and an artist (performer) currently in charge of dance on the one or more sub-videos, among artists belonging to the artist group, by analyzing the one or more received videos,
wherein the second multi-view layout setting includes a 2-1 multi-view layout setting in which: when a plurality of artists are currently in charge of the song part, one of the plurality of artists is arranged on one main video and the other artists are arranged on one or more other main videos, and a size of the one or more other main videos on which the other artists are arranged is set to be the same as the size of the one main video to arrange the other main videos side by side with the one main video or in a grid layout along with the one main video.

* * * * *